US008843742B2

(12) United States Patent
Barde

(10) Patent No.: US 8,843,742 B2
(45) Date of Patent: Sep. 23, 2014

(54) HYPERVISOR SECURITY USING SMM

(75) Inventor: Kaushik C. Barde, Sunnyvale, CA (US)

(73) Assignee: Hewlett-Packard Company, Palo Alto, CA (US)

(*) Notice: Subject to any disclaimer, the term of this patent is extended or adjusted under 35 U.S.C. 154(b) by 1713 days.

(21) Appl. No.: 12/229,705

(22) Filed: Aug. 26, 2008

(65) Prior Publication Data

US 2010/0057982 A1    Mar. 4, 2010

(51) Int. Cl.
*G06F 21/00* (2013.01)
*G06F 21/57* (2013.01)
*G06F 21/64* (2013.01)

(52) U.S. Cl.
CPC .............. *G06F 21/57* (2013.01); *G06F 21/64* (2013.01)
USPC ........... 713/164; 713/186; 713/187; 713/193; 726/22; 726/26; 726/27; 711/104; 711/165

(58) Field of Classification Search
USPC ........ 713/164, 186, 187, 193; 726/27, 22, 26; 711/104, 165
See application file for complete search history.

(56) References Cited

U.S. PATENT DOCUMENTS

| 4,300,192 | A |   | 11/1981 | Couleur |  |
|---|---|---|---|---|---|
| 5,175,853 | A |   | 12/1992 | Kardach et al. |  |
| 5,339,437 | A | * | 8/1994 | Yuen | 710/261 |
| 5,734,844 | A |   | 3/1998 | Moughanni et al. |  |
| 5,850,559 | A | * | 12/1998 | Angelo et al. | 713/320 |
| 5,937,200 | A |   | 8/1999 | Frid et al. |  |
| 5,951,685 | A |   | 9/1999 | Stancil |  |
| 6,378,083 | B1 | * | 4/2002 | Yamanaka et al. | 713/601 |
| 6,393,560 | B1 | * | 5/2002 | Merrill et al. | 713/2 |
| 6,532,510 | B2 |   | 3/2003 | Klein |  |
| 6,694,346 | B1 |   | 2/2004 | Aman et al. |  |
| 6,915,402 | B2 |   | 7/2005 | Wilson |  |
| 7,143,287 | B2 | * | 11/2006 | Bade et al. | 713/164 |
| 7,209,994 | B1 | * | 4/2007 | Klaiber et al. | 710/264 |
| 7,225,284 | B2 |   | 5/2007 | Rangarajan et al. |  |
| 7,260,848 | B2 | * | 8/2007 | Zimmer | 726/27 |
| 7,278,168 | B1 | * | 10/2007 | Chaudhury et al. | 726/30 |
| 7,380,136 | B2 | * | 5/2008 | Zimmer et al. | 713/193 |

(Continued)

FOREIGN PATENT DOCUMENTS

| CN | 1487424 A | 4/2007 |
|---|---|---|
| CN | 101038556 A | 9/2007 |

(Continued)

OTHER PUBLICATIONS

Rutkowska et al. "Preventing and Detecting Xen Hypervisor Subversions," Black Hat, USA, Aug. 7, 2008 (found at http://invisiblethingslab.com/itl/Resources.html).*

(Continued)

*Primary Examiner* — Luu Pham
*Assistant Examiner* — Kari Schmidt

(57) ABSTRACT

Methods, systems, apparatuses and program products are disclosed for protecting computers and similar equipment from undesirable occurrences, especially attacks by malware. Invariant information, such as pure code and some data tables may be enrolled for later revalidation by code operating outside the normal context. For example, a periodic interrupt may invoked a system management mode interrupt service routine to discover whether code regions accessible to Protected Mode programs have become corrupted or otherwise changed, such as by tampering from untrusted or untrustworthy programs that have easy access only to protected mode operation.

21 Claims, 5 Drawing Sheets

(56) References Cited

U.S. PATENT DOCUMENTS

| | | | |
|---|---|---|---|
| 7,418,584 B1* | 8/2008 | Klaiber et al. | 712/229 |
| 7,698,507 B2* | 4/2010 | Ghetie | 711/138 |
| 7,822,979 B2* | 10/2010 | Mittal | 713/164 |
| 2003/0005247 A1* | 1/2003 | Chang | 711/163 |
| 2003/0229794 A1* | 12/2003 | Sutton et al. | 713/189 |
| 2004/0105298 A1 | 6/2004 | Symes | |
| 2004/0153672 A1 | 8/2004 | Watt | |
| 2004/0177342 A1 | 9/2004 | Worley | |
| 2004/0243783 A1 | 12/2004 | Ding | |
| 2005/0060590 A1 | 3/2005 | Bradley et al. | |
| 2005/0210467 A1* | 9/2005 | Zimmer et al. | 718/1 |
| 2005/0289311 A1* | 12/2005 | Durham et al. | 711/163 |
| 2006/0004982 A1* | 1/2006 | Matheny | 711/202 |
| 2006/0040642 A1 | 2/2006 | Boris | |
| 2006/0047958 A1* | 3/2006 | Morais | 713/166 |
| 2006/0101224 A1 | 5/2006 | Shah et al. | |
| 2006/0179308 A1* | 8/2006 | Morgan et al. | 713/168 |
| 2006/0212520 A1* | 9/2006 | Logue et al. | 709/206 |
| 2006/0236122 A1 | 10/2006 | Field | |
| 2006/0294519 A1 | 12/2006 | Hattori | |
| 2008/0022063 A1 | 1/2008 | Pant et al. | |
| 2008/0126650 A1* | 5/2008 | Swanson et al. | 710/267 |
| 2009/0157936 A1* | 6/2009 | Goss et al. | 710/264 |
| 2010/0005267 A1 | 1/2010 | Barde | |
| 2010/0031270 A1 | 2/2010 | Wu et al. | |
| 2010/0050174 A1 | 2/2010 | Zhou et al. | |

FOREIGN PATENT DOCUMENTS

| | | |
|---|---|---|
| JP | 1999-282685 | 10/1999 |
| JP | 2001-236237 | 8/2001 |
| JP | 2001-256066 | 9/2001 |
| JP | 2002-140229 | 5/2002 |
| JP | 2004-103009 | 4/2004 |
| JP | 2007-035010 | 2/2007 |
| JP | 2008-108260 | 5/2008 |
| TW | 544576 B | 8/2003 |
| TW | 200540711 | 12/2005 |
| WO | WO-2008073618 | 6/2008 |

OTHER PUBLICATIONS

Fraser, T. et al., "VICI Virtual Machine Introspection for Cognitive Immunity," Computer Security Applications Conference, 2008. ACSAC 2008. Annual, vol., no., pp. 87,96, Dec. 8-12, 2008.*

Azab, A.M. et al., "HIMA: A Hypervisor-Based Integrity Measurement Agent," Computer Security Applications Conference, 2009. ACSAC '09. Annual, vol., no., pp. 461,470, Dec. 7-11, 2009.*

Wu Chang Feng, Portland University, "OS Independent Run-time System Integrity Services", http://www.thefengs.com/wuchang/work/courses/cs592_spring2007/SystemIntegrityServices.pdf.

"Bios leader Phoenix working on its own hypervisor"; http://virtualization.info/en/news/2007/10/bios-leader-phoenix-working-on-its-own.html, Oct. 27, 2007 (1 page).

"PhoenixHyperSpace: Transforming the personal computing experience", 2007 (2 pages).

Nadathur A: "Phoenix HyperSpace—Transforming the personal computing experience", Internet Article, [Online], Dec. 4, 2007, pp. 1-2, XP002543127, Retrieved from the Internet: URL:http://www.hyperspace.com/uploads/hype.

Perilli A: "Phoenix to unveil its virtualization strategy in February", Internet Article, [Online]Jan. 21, 2008, pp. 1-2,XP002543128,Retrieved from the Internet: URL:http://www.virtualization.info/2008/01/phoenix-to-unveil-its-virtualization.html.

Toshikazu Watanabe, "New Infrastructure brought by Server Virtualization—ServerVirtualization Technique Reaching a Time for Practical Use", Complete Guide to Data Center, Japan, Impress R&D, Jul. 1, 2008, Summer Edition, 2008, p. 70-73.

VMware, The Role of Memory in VMware ESX Server 3, Sep. 2006 (11 pages).

* cited by examiner

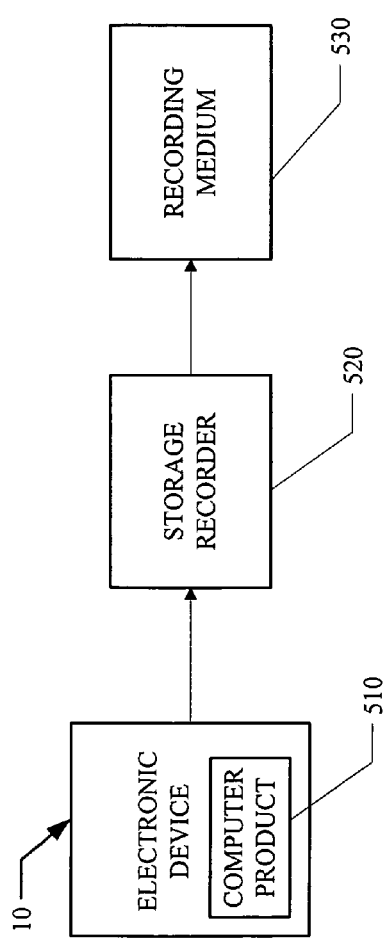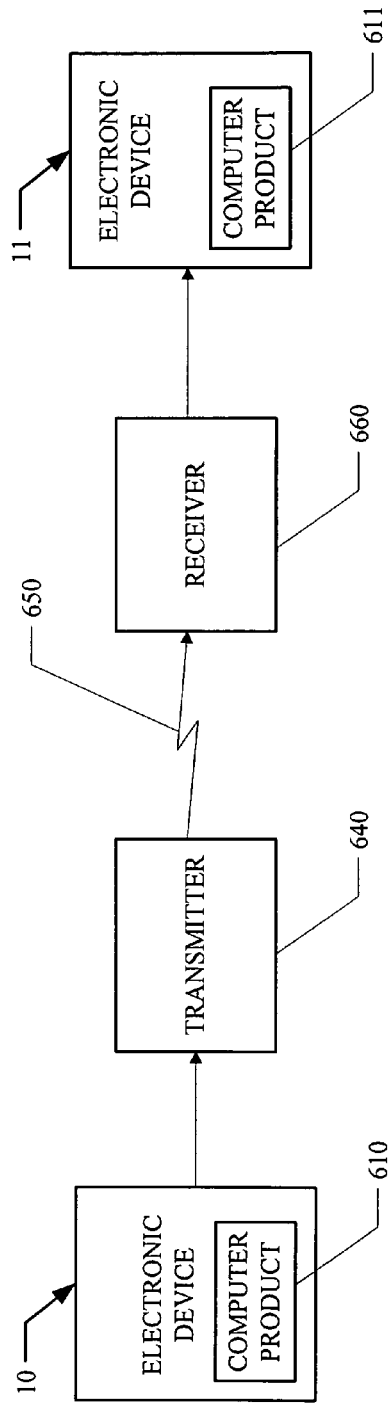

HYPERVISOR SECURITY USING SMM

RELATED APPLICATIONS

This application is related to U.S. patent application Ser. No. 12/217,240, entitled "Memory Management for Hypervisor Loading", filed on Jul. 2, 2008, U.S. Publication No. 2010/0005267.

FIELD OF THE INVENTION

The present invention generally relates to personal computers and devices sharing similar architectures. The invention more particularly relates to a system and method for enabling improved performance and security in hypervisor programs and the like.

BACKGROUND OF THE INVENTION

Modernly, usage of PCs (personal computers) is quite commonplace, yet still growing. Affordable hardware becomes faster and has more capabilities and capacities with each passing year. Application software to handle new tasks and system software to handle new devices continues to emerge.

For various reasons, many emerging personal computer designs will incorporate Hypervisor programs or VMM (Virtual Machine Monitor) programs which are at least closely related. Moreover the Hypervisor is expected to be located deep in the computer architecture having a crucial supervisory role over at least some of the computer hardware; most notably the CPU (Central Processor Unit) time resource, which is closely tied to circuitry clock cycles.

As such, Hypervisors make a particularly attractive target for malware which is growing problem. Various improvements that target malware have been proposed but one of the more promising approaches is to run a computer's general purpose software under the control of a hypervisor and to harden the hypervisor against attack. Part of the reasoning behind this approach is that malware attacks on software are modernly through design or implementation flaws in the software itself.

Moreover, the most highly valued (by both users and attackers) applications can be relatively simple and contrasted with lower value applications which must often be complex. A good illustration might be online banking (capable of being kept simple and great wealth may be at stake) as contrasted with online game playing (might involve complex imaging and animation but often with little or no money being at stake).

One approach, taken by Phoenix Technologies® Ltd., assignee of the present invention, is to provide a small hypervisor (for example the HyperCore™ product) which is tightly integrated to a very few small hardened application programs. HyperCore™ also hosts, but is only loosely connected to, a general purpose (complex) computer environment or operating system such as Microsoft® Windows® or Linux®.

In order to achieve its aims of being small and hardened against attacks, HyperCore™ is necessarily limited in features to the minimal subset required in the circumstances. In particular, HyperCore™ supports only one complex O/S (Operating System) per session and does not virtualize most resources. In this context, session may be defined as a temporal interval extending from a power-on bootload to a reboot or power-off condition. In a HyperCore™ environment, most resources are not virtualized but are made available on a simple pass-through basis to the one and only complex O/S that is present. The small hardened applications have only a minimal subset of virtualized resources (such as the mouse keyboard and screen whenever the hardened application has the execution focus and a share of CPU cycles and of virtual memory). In summary then, at any one time HyperCore™ hosts one complex O/S with applications running under that O/S and in addition, HyperCore™ simultaneously hosts a number of small and trusted applications which are hardened against malware attack.

Various security measures, notably incorporating TPM (Trusted Platform Module) exist to establish a chain of trust that enables a hypervisor to be assuredly clean (i.e. not compromised by malware) at the time it is loaded. This is based on making the very reasonable assumption that the computer can be manufactured and initially loaded with firmware and software in a secure environment where it is not at risk from malicious attack. Indeed it is probably fair to say that almost all malware attacks come through data communication (mostly Internet) or removable media (e.g. Unified Serial Bus (USB) "Flash Drives") after the computer leaves the controlled manufacturing and distribution environment.

It is important that protection of hypervisor and hardened applications includes but is not limited to ensuring they are not tampered with as of when they are loaded and that the code is itself thoroughly debugged. In order to be thoroughly debugged code (parts of the hypervisor and the hardened applications) must be kept relatively simple and therefore small in terms of code size. But it is also necessary that all code but the smallest and most highly protected code is also subjected to run-time periodic checks to discover whether (unauthorized) changes have been made.

The run-time periodic checks themselves, in turn, become attractive targets for the ever more ingenious malware perpetrators and the present invention addresses, inter alia, the issue of how the integrity and security of run-time periodic checks may themselves be hardened against attack.

Thus, the disclosed improved computer designs enable superior tradeoffs in regards to the problems outlined above, and more.

SUMMARY OF THE INVENTION

Accordingly, the invention provides a method for operating a computer for security and also apparatus that embodies the method. In addition program products and other means for exploiting the invention are presented.

According to an aspect of the invention an embodiment of the invention may provide for forming an initial digest of a first region of read-write memory, the first region of read-write memory containing a first set of instruction codes operable to execute in a protected mode, typically this could be for at least one hardened application or hypervisor code itself.

The same embodiment of the invention may further provide for enrolling the initial digest into a second region of read-write memory reserved for access by a second set of instruction codes operable to execute in a real mode or operable to act as a platform management interrupt service routine, typically this memory would be in SMM (system management memory) or otherwise substantially or entirely unavailable to the O/S or programs the O/S might load and initiate.

Then, responsive to a management mode interrupt, the embodiment of the invention may provide for forming a recalculated digest of the first region and consistency checking it with the enrolled digest. Other embodiments of the invention may use multiple enrolled digests and varying consistency checks.

According to a further embodiment of the invention, there may also be operational tamper resistance with the help of SMM based "watch-dog" code. SMM watchdog code may periodically measure by continually creating digests and consistency checking them to ensure operational security. This type of hardening may be necessary for implementing a high level of practical security.

Several variants of these aspects are also discussed together with alternative exemplary embodiments.

BRIEF DESCRIPTION OF THE DRAWINGS

The aforementioned and related advantages and features of the present invention will become better understood and appreciated upon review of the following detailed description of the invention, taken in conjunction with the following drawings, which are incorporated in and constitute a part of the specification, illustrate an embodiment of the invention and wherein like numerals represent like elements, and in which:

FIG. 5 shows how an exemplary embodiment of the invention may be encoded onto a computer medium or media.

FIG. 6 shows how an exemplary embodiment of the invention may be encoded, transmitted, received and decoded using electromagnetic waves.

For convenience in description, identical components have been given the same reference numbers in the various drawings.

DETAILED DESCRIPTION OF THE PREFERRED EMBODIMENTS

Figure 1:
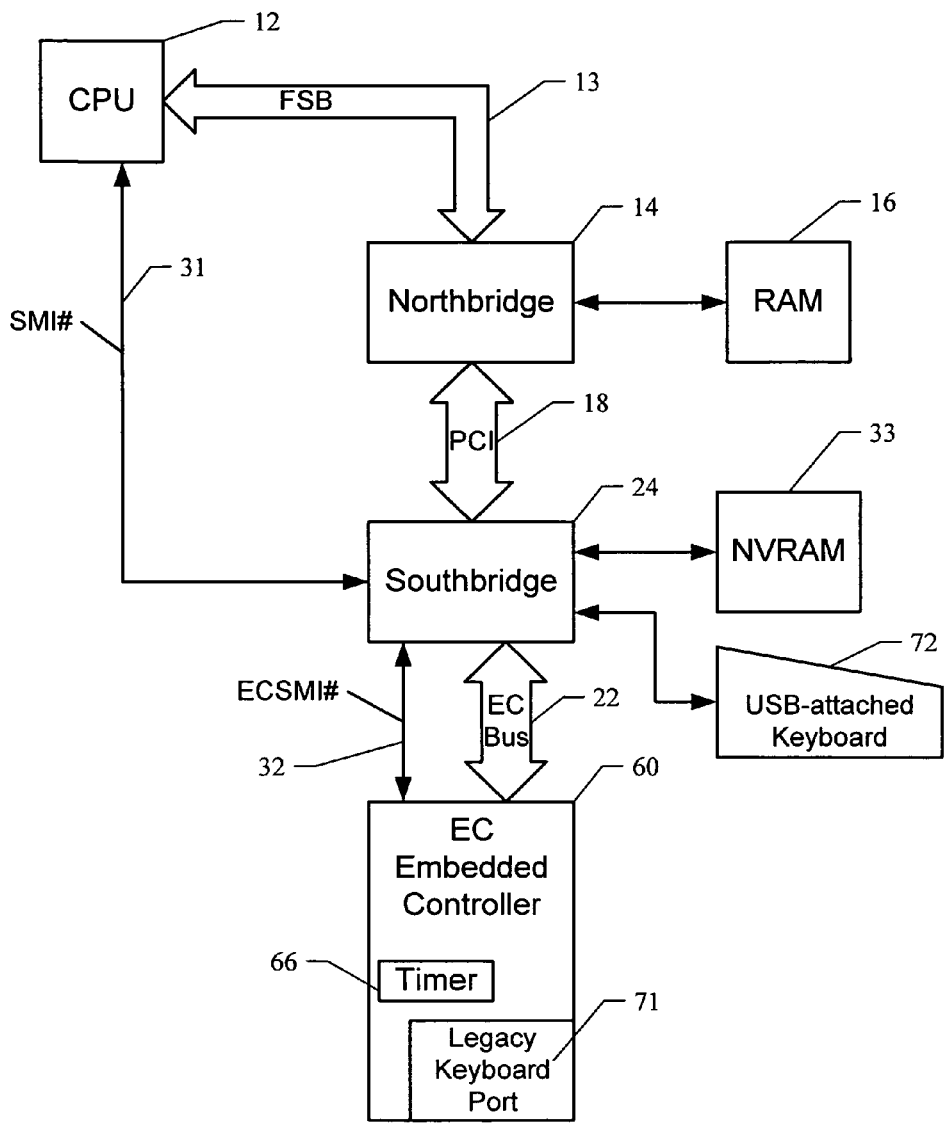
FIG. 1 is a schematic block diagram of an electronic device configured to implement the security functionality according to an embodiment of the invention of the present invention.

In the following description, for purposes of clarity and conciseness of the description, not all of the numerous components shown in the schematics and/or drawings are described. The numerous components are shown in the drawings to provide a person of ordinary skill in the art a thorough, enabling disclosure of the present invention. The operation of many of the components would be understood and apparent to one skilled in the art.

The description of well known components is not included within this description so as not to obscure the disclosure or take away or otherwise reduce the novelty of the present invention and the main benefits provided thereby.

In the described embodiment, the described CPU (Central Processing Unit) may be essentially an IA-32 conforming microprocessor manufactured by Intel® Corporation. Throughout this description, certain terminology relating to Intel IA-32 CPUs, such as register names, signal nomenclature, etc., is employed to describe the present invention. Such terminology is understood by practitioners in the field of microprocessor design and will therefore not be explained at length herein. The invention is not limited to IA-32 conforming microprocessors they are exemplary only.

An exemplary embodiment of the present invention will now be described with reference to the figures.

FIG. 1 is a schematic block diagram of an electronic device configured to implement the security functionality according to an embodiment of the invention of the present invention.

In an exemplary embodiment, the electronic device 10 is implemented as a personal computer, for example, a desktop computer, a laptop computer, a tablet PC or other suitable computing device. Although the description outlines the operation of a personal computer, it will be appreciated by those of ordinary skill in the art, that the electronic device 10 may be implemented as a PDA, wireless communication device, for example, a cellular telephone, embedded controllers or devices, for example, set top boxes, printing devices or other suitable devices or combination thereof and suitable for operating or interoperating with the invention.

The electronic device 10 may include at least one processor or CPU (Central Processing Unit) 12, configured to control the overall operation of the electronic device 10. Similar controllers or MPUs (Microprocessor Units) are commonplace.

The processor 12 may typically be coupled to a bus controller 14 such as a Northbridge chip by way of a bus 13 such as a FSB (Front-Side Bus). The bus controller 14 may typically provide an interface for read-write system memory 16 such as RAM (random access memory).

The bus controller 14 may also be coupled to a system bus 18, for example a PCI (peripheral component interconnect bus). Coupled to the PCI 18 may be a peripheral device controller 24 such as a Southbridge chip. In turn peripheral device controller 24 may be coupled to various other devices such as a NVRAM 33 (non-volatile RAM) and an EC Bus 22 (Embedded Controller bus).

A circuit SMI#31 (System Management Interrupt, active-low) is provided to allow a Southbridge to interrupt the CPU 12 by causing it to enter SMI mode and to execute a SMI ISR (Interrupt Service Routine).

The EC Bus 22 may be coupled to an Embedded Controller chip 60. The Embedded Controller 60 may in turn connect to a variety of peripheral devices and may have many features such as the ability to act as a USB (Universal Serial Bus) master and/or as an embedded keyboard controller. A legacy style keyboard port 71 may be provided. Also, a USB port which may couple to various devices may be provided (not shown).

The Southbridge chip 24 also has, in typical implementation, a capability to operate as a USB Master, and this is the way a USB-attached keyboard 72 will normally be provided if present. If a USB-attached keyboard 72 then it is likely that there will not be a legacy style keyboard, however a legacy style keyboard port 71 will likely still be present on the EC 60; indeed even Southbridge USB keyboard support may use the EC chip for compatibility reasons (such as for old game software that uses real mode support for keyboard).

Other components (not shown in FIG. 1) are likely to be present in the Embedded Controller chip 60, such as interfaces for other types of device of various kinds.

Additionally the Embedded Controller 60 has a circuit ECSMI#32 (Embedded Controller SMI#) which allows the Embedded Controller 60 to command the Southbridge 24 to raise an SMI in the CPU 12. In many implementations the EC 60 comprises EC timer circuits 66 that can be programmed by BIOS to generate periodic SMIs. However in some implementations it may be necessary to use registers associated with the legacy keyboard port in addition to the EC timer registers and circuit 66 for that purpose.

Figure 2:
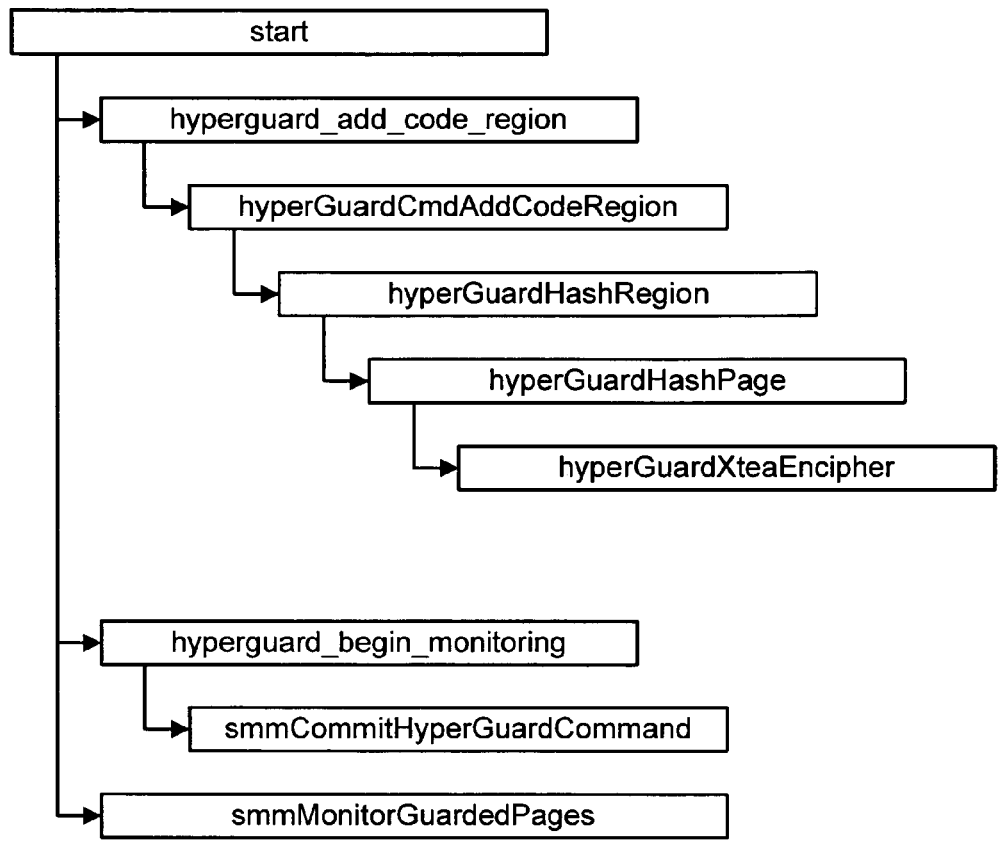
FIG. 2 is a call tree chart showing the relationship between instruction modules configured to implement the security functionality according to an embodiment of the invention of the present invention.

FIG. 2 is a call tree chart showing the relationship between instruction modules configured to implement the security functionality according to an embodiment of the invention of the present invention. It should be appreciated that the disclosed implementation is purely exemplary and includes choices made in implementation where other choices could easily have been used. The meanings and purposes of the various routines may better become understood with reference to the later flow diagrams and functional descriptions.

The hyperguard_add_code_region procedure may be invoked by a protected mode routine to present a memory region for enrollment. The hyperGuardCmdAddCodeRegion may be a SMM routine that services a request created by hyperguard_add_code_region invocation.

Within hyperGuardCmdAddCodeRegion, the hyperGuardHashRegion may be used to calculate a digest, such as a checksum or hash value for a specified memory region. The hyperGuardHashPage routine may be a page by page iteration for handling a large region. Protected memory applications typically use a paged memory approach to address virtualization as is well-known in the art. Pages of physical memory are usually of fixed size (even though some architectures support more than one size they typically do not do so with simultaneity). Because pages are of fixed size it may be convenient in implementation to make pagewise iteration.

The hyperGuardXteaEncipher routine may provide the actual mathematical algorithm used to form a digest. Xtea is a well-known and highly esteemed block cipher in modern cryptography.

The hyperguard_begin_monitoring procedure may be invoked by a protected mode routine to signal an end to enrollment and a start of active monitoring. The smmCommitHyperGuardCommand may be a responsive SMM ISR that provides for prohibition of further attempts to enroll (since all legitimate enrollment is hereby completed). Further action by this routine may include arming (initiating) a hardware timer that raises SMI on a periodic (heartbeat) basis.

The ISR smmMonitorGuardedPages may provide for runtime integrity checks responsive to a heartbeat SMI. Such checks may include digest recalculation and revalidation against enrolled values as described below.

Figure 3A:
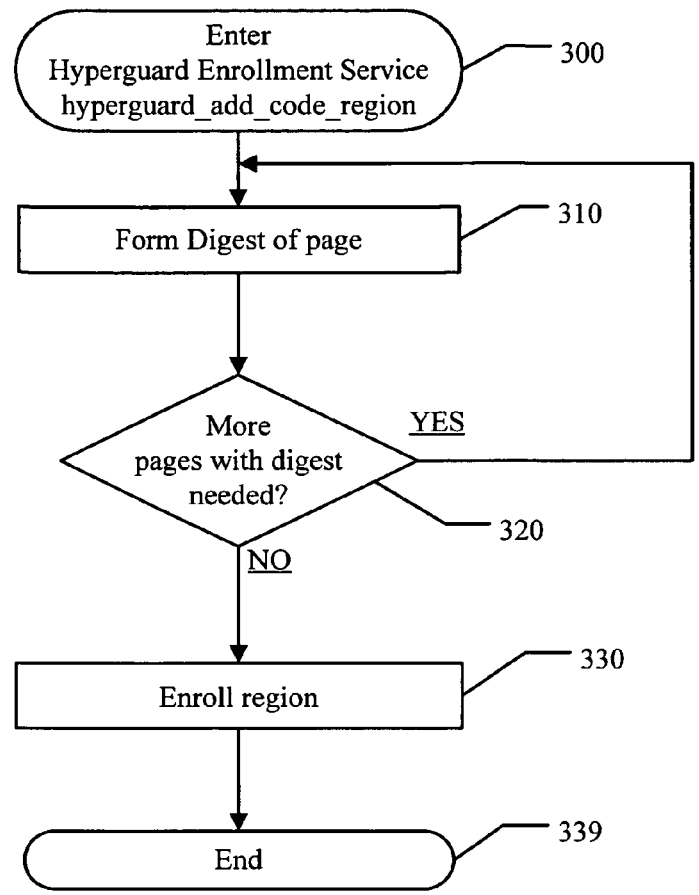
FIG. 3A is a flow chart illustrating the steps performed in an initial phase of code execution to implement the security functionality according to an embodiment of the invention of the present invention.

FIG. 3A is a flow chart illustrating the steps performed in an initial phase of code execution to implement the security functionality according to an embodiment of the invention of the present invention. FIG. 3A is purely exemplary and many alternative embodiments are possible within the general scope of the invention.

In step 300, within the exemplary Hyperguard™ product, entry is made to this firmware HyperGuard™ Enrollment Service called hyperguard_add_code_region for implementing a first part of the security functionality.

Typically, but not necessarily, this entry is made by way of a so-called "software-SMI" which is a feature commonplace and well-known in the art. Software-SMI features are commonly implemented by way of a Write instruction to a well-known Port (commonly Port 92h). Referring briefly to FIG. 1, typically the Port 92h function is provided in the Southbridge 24 and causes an active-low condition on the SMI#31 signal conductor which causes an SMI in the CPU 12. This is termed a "software-SMI" because it is caused by a directed software action even though dedicated hardware (Port 92h) is involved.

A reason for using a software-SMI in these circumstances may be so that the initialization routine of FIG. 3A is executed in SMM (System management mode) which is also well-known by persons of ordinary skill in the art. In IA-32, among others, SMM is a real mode of CPU operation, that is to say it is not reliant on Virtual Addresses for operation. Some CPUs have a small real mode (20 bit addressing) that addresses up to 1 Megabyte and also a large address (32 bit addressing) real mode which is commonly and colloquially known as the "Unreal Mode". Even larger memory variants may also exist, such as for so-called 64-bit CPUs though only paged memory is typically used for extremely large memory spaces.

Alternative embodiments may use other means to get into a real mode or special management mode within the general scope of the invention. In other embodiments other processor architectures may by design use alternatives to SMM, for example a CPU of the Itanium™ family may use a PMI (Processor Management Interrupt) in a somewhat similar, but broadly comparable, manner. Other substantially equivalent features may exist and be used within the general scope of the invention especially where somewhat different CPU architectures are deployed. In some architectures (such as but not limited to the Itanium™ family of CPUs) platform management interrupt service routines may be used as an alternative.

Thus the hyperguard_add_code_region process is typically, but not essentially, implemented as an SMM ISR invoked by software SMI.

Referring back to FIG. 3A, at step 310 a Digest is formed. Digests of a page or regions of data or code are well known in the art and typically involve the use of checksum algorithms. Typically, the calling code which lies outside the SMM memory will decide which code pages, regions or segments are to be protected by HyperGuard™. In an embodiment of the invention it may be DOM0, the privileged domain of a hypervisor program that decides to enroll its own pages of executable code (and sensitive invariant data tables) for protection. Since, in this exemplary embodiment, hyperguard_add_code_region is executing in SMM it has access to SMM memory. In contrast, DOM0 may typically execute in Protected mode and will not have access to SMM memory.

Referring again to FIG. 3A, at step 320 a determination is made as to whether more pages within the present code region require calculation of digests and if so control returns to step 310 to form the digest for the next page of memory. Otherwise control passes to step 330 at which digests for the requested region are enrolled by being stored in SMM memory space.

At step 339 exit is made from the hyperguard_add_code_region service routine such as by using a conventional Return-from-interrupt instruction.

Figure 3B:
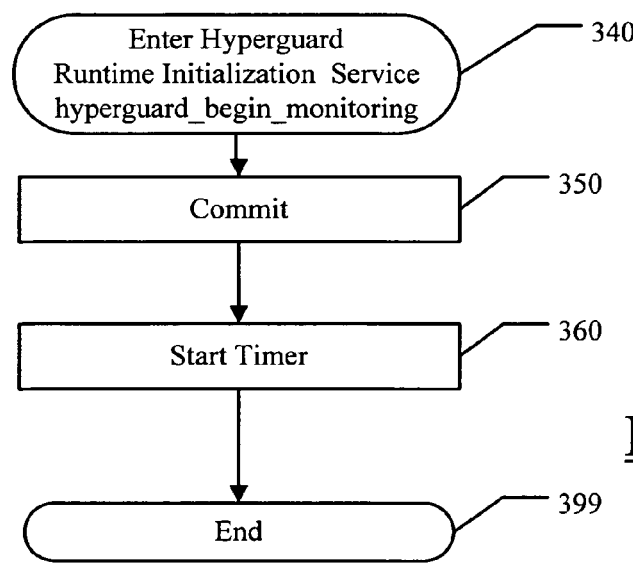
FIG. 3B is a flow chart illustrating the steps performed in a later initial phase of code execution to implement the security functionality according to an embodiment of the invention of the present invention.

FIG. 3B is a flow chart illustrating the steps performed in a later initial phase of code execution to implement the security functionality according to an embodiment of the invention of the present invention.

In step 340, within the exemplary HyperGuard™ product, entry is made to this firmware HyperGuard™ Runtime Initialization Service called hyperguard_begin_monitoring for implementing a first part of the security functionality. In an embodiment of the invention this routine is entered in a similar manner to the hyperguard_add_code_region procedure described above from code typically executed in Protected mode within a hypervisor initialization process such as the paradigmatic DOM0 of hypervisor Xen which is well-known in the art.

At step 350 the smmCommitHyperGuardCommand is executed. This command has a purpose of ending the enrollment process. That is to say internal control conditions are raised that prevent execution of any further command requests to enroll pages or regions until after the next CPU reset (which necessarily causes all memory to be clear and all enrollment context to be reset). At step 360 a further purpose of the smmCommitHyperGuardCommand takes place in that the timer is started. The timer referred to is a hardware timer, typically embodied as circuitry within the EC (embedded controller chip, 60 of FIG. 1). The timer could, in some implementation be embodied as circuitry within the Southbridge (24, FIG. 1) or otherwise. However in a typical embodiment of the invention the timer circuit will be closely associated with the embedded keyboard controller and collocated within the EC.

The purpose of using a hardware timer is to program the circuitry to generate SMIs on a periodic or "heartbeat" basis to cause execution of the smmMonitorGuardedPages routine (see discussion around FIG. 4, below). Such an SMI is not regarded as a software SMI such as might be created by malware.

Figure 4:
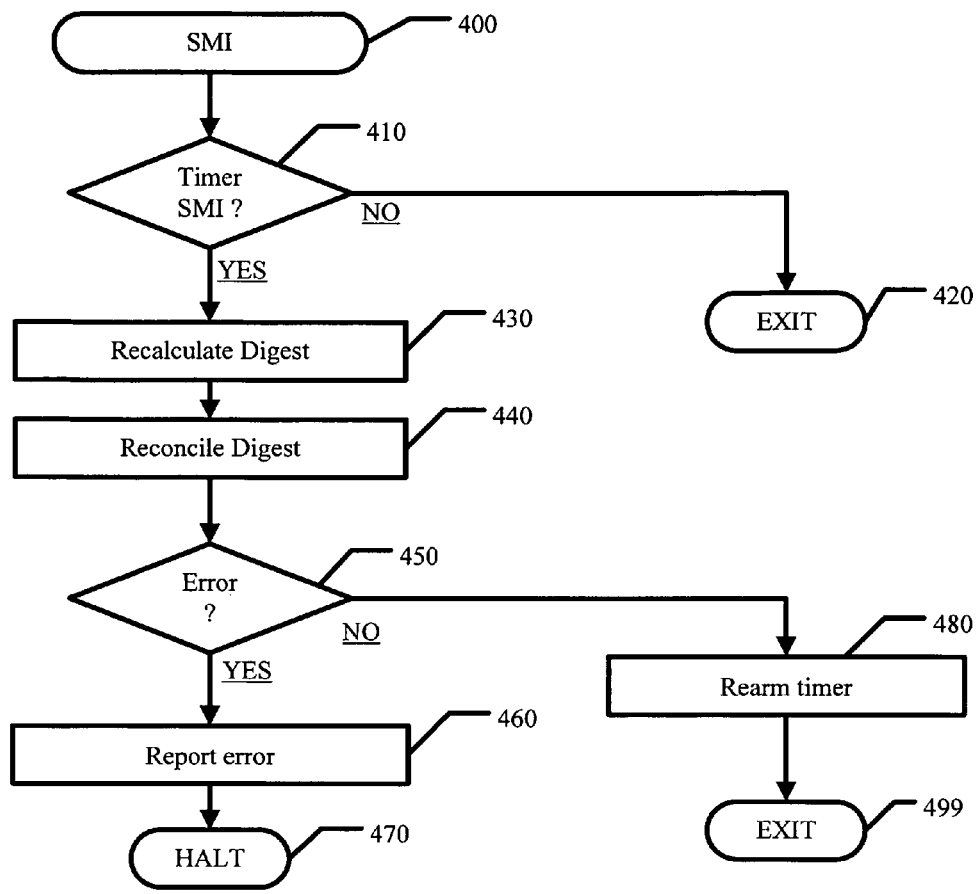
FIG. 4 is a flow chart illustrating the steps performed in a periodically executed ISR (interrupt service routine) to implement the security functionality according to an embodiment of the invention of the present invention.

FIG. 4 is a flow chart illustrating the steps performed in a periodically executed ISR (interrupt service routine) to implement the security functionality according to an embodiment of the invention of the present invention.

In an embodiment of the invention, the procedure of FIG. 4 is implemented as a function called smmMonitorGuardedPages. Referring to FIG. 4, at step 400, the smmMonitorGuardedPages routine is entered by way of an SMI.

At step 410, a check is made to determine whether the interrupt originates as a hardware timer SMI (heartbeat SMI), if not control is passed to box 420 to exit for further implementation-dependent action, such as processing the SMI for an unrelated purpose. It should be appreciated that in a typical CPU architecture, SMIs are asynchronous and SMI# signals may be anisochronous. Thus, it can happen that a hardware SMI and a software SMI (really a Port 92h SMI) can occur in effective simultaneity. Such a software SMI may be legitimate or it may be an artifact of malware and both possibilities must be considered.

A simple approach to this issue, and the one implied by FIG. 4 is that there is no attempt to cater for nesting or queuing of SMIs. Hardware SMIs caused by timers that happen to fall in effective simultaneity with software SMIs may simply be lost. The loss of a heartbeat SMI will not cause insurmountable problems if not all such interrupts are lost. Other implementation approaches are possible too. In most implementations SMIs are handled robustly and spurious and lost interrupts cause only transient effects.

At step 430 one or more digests of enrolled pages or regions are recalculated. If not all digests are recalculated a likely reason for such a design choice would be to prevent CPU load from becoming excessive. For example pages could be selected from among the enrolled pages on a round-robin basis or randomly. In that case, all enrolled pages could be recalculated eventually even though not all enrolled pages are recalculated at every hardware timer SMI.

At step 440 a digest (or more than one digest) that was recalculated in step 430 (above) is reconciled against the enrolled value. It should match because enrolled pages are, for example, pure code or invariant data. If a mismatch is found at step 450 then an error condition may exist. In this case something has changed that was not expected to have changed and the most likely explanations are a malware attack or a software or hardware malfunction. In case of error, control is passed to step 460 at which the error is reported and the hypervisor is alerted to halt (step 470) such as for post-mortem purposes.

Alternatively, if all is well the timer can be rearmed at 480 and the ISR may be exited 499 in the normal way, for either further processing of the SMI or, if all finished, for return to Protected mode.

FIG. 5 shows how an exemplary embodiment of the invention may be encoded onto a computer medium or media.

With regards to FIG. 5, computer instructions to be incorporated into in an electronic device 10 may be distributed as manufactured firmware and/or software computer products 510 using a variety of possible media 530 having the instructions recorded thereon such as by using a storage recorder 520. Often in products as complex as those that deploy the invention, more than one medium may be used, both in distribution and in manufacturing relevant product. Only one medium is shown in FIG. 5 for clarity but more than one medium may be used and a single computer product may be divided among a plurality of media.

FIG. 6 shows how an exemplary embodiment of the invention may be encoded, transmitted, received and decoded using electromagnetic waves.

With regard to FIG. 6, additionally, and especially since the rise in Internet usage, computer products 610 may be distributed by encoding them into signals modulated as a wave. The resulting waveforms may then be transmitted by a transmitter 640, propagated as tangible modulated electromagnetic carrier waves 650 and received by a receiver 660. Upon reception they may be demodulated and the signal decoded into a further version or copy of the computer product 611 in a memory or other storage device that is part of a second electronic device 11 and typically similar in nature to electronic device 10.

Other topologies devices could also be used to construct alternative embodiments of the invention.

The embodiments described above are exemplary rather than limiting and the bounds of the invention should be determined from the claims. Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method comprising:
    calculating, by a computer, an initial digest based on content in a first region of read-write memory, the first region of read-write memory containing hypervisor code to execute in a protected mode;
    enrolling, by the computer, the initial digest into a second region of read-write memory reserved for access by a second set of instruction codes to execute in a real mode different from the protected mode or to act as a platform management interrupt service routine; and
    responsive to a management mode interrupt, executing a third set of instruction codes in the computer to form a recalculated digest based on the content in the first region of read-write memory.

2. The method of claim 1 wherein:
    the second region of read-write memory is located within an SM RAM (system management random access memory).

3. The method of claim 1 wherein:
    the real mode is an SMM (system management mode).

4. The method of claim 1 wherein:
    the third set of instruction codes is selected from the second set of instruction codes.

5. The method of claim 1 wherein:
the enrolling is performed in response to a first SMI (system management interrupt).

6. The method of claim 1 further comprising:
generating the management mode interrupt in response to expiration of a timer.

7. The method of claim 3 further comprising:
responsive to an SMI (system management interrupt), receiving a commit command to prohibit further enrollment commands and to arm a timer circuit.

8. The method of claim 1 further comprising:
reconciling the initial digest with the recalculated digest by determining whether the initial digest matches the recalculated digest.

9. The method of claim 8, further comprising:
in response to determining that the initial digest does not match the recalculated digest, indicating an error condition.

10. The method of claim 1 wherein:
the calculating, the enrolling and the executing are performed after the computer receives a power-on reset signal and before any operating system becomes resident in any main memory within the computer.

11. The method of claim 1, wherein the initial digest is one of a checksum and hash value, and the recalculated digest is one of a checksum and hash value.

12. The method of claim 1, wherein enrolling the initial digest into the second region of read-write memory comprises storing the initial digest into the second region of read-write memory.

13. A computer program product comprising:
at least one non-transitory computer-readable medium having computer instructions encoded therein, the instructions when executed by at least one computer cause said at least one computer to:
  calculate an initial digest based on content in a first region of read-write memory containing hypervisor code to execute in a protected mode;
  enroll the initial digest into a second region of read-write memory reserved for access by a second set of instruction codes to execute in a real mode different from the protected mode or to act as a platform management interrupt service routine; and
  responsive to a management mode interrupt, execute a third set of instruction codes to form a recalculated digest based on the content in the first region of read-write memory.

14. The computer program product of claim 13 wherein:
the management mode interrupt is an SMI (System Management Interrupt) generated in response to expiration of a timer.

15. The computer program product of claim 13, wherein the computer instructions when executed cause the at least one computer to further:
compare the recalculated digest to the initial digest to determine if the recalculated digest matches the initial digest; and
in response to determining that the recalculated digest does not match the initial digest, indicate an error.

16. The computer program product of claim 13, wherein the real mode is an SMM (system management mode), and wherein the instructions when executed cause said at least one computer to further:
responsive to an SMI (system management interrupt), receive a commit command to prohibit further enrollment commands and to arm a timer circuit.

17. A method comprising:
forming, by a computer, an initial digest of a first region of read-write memory containing hypervisor code to execute in a protected mode, wherein the initial digest is one of a checksum and a hash value;
enrolling, by the computer, the initial digest into a second region of read-write memory reserved for access by a second set of instruction codes to execute in a real mode different from the protected mode or to act as a platform management interrupt service routine;
responsive to a management mode interrupt, forming, by the computer, a recalculated digest of the first region of read-write memory, wherein the recalculated digest is one of a checksum and a hash value; and
comparing, by the computer, the recalculated digest to the initial digest to determine whether content in the first region has been changed.

18. The method of claim 17 wherein:
the management mode interrupt is an SMI (System Management Interrupt) generated in response to expiration of a timer.

19. The method of claim 17, further comprising:
in response to determining that the recalculated digest does not match the initial digest, indicating an error.

20. An electronic device comprising:
at least one controller or CPU (central processor unit); and
at least one non-volatile memory having computer instructions encoded therein, the instructions when executed by the at least one controller or CPU cause said at least one controller or CPU to:
  calculate an initial digest based on content in a first region of read-write memory containing hypervisor code to execute in a protected mode;
  enroll the initial digest into a second region of read-write memory reserved for access by a second set of instruction codes to execute in a real mode different from the protected mode or to act as a platform management interrupt service routine; and
  responsive to a management mode interrupt, execute a third set of instruction codes to form a recalculated digest of the first region of read-write memory.

21. The electronic device of claim 20, wherein the real mode is an SMM (system management mode), and wherein the instructions when executed cause said at least one controller or CPU to further:
responsive to an SMI (system management interrupt), receive a commit command to prohibit further enrollment commands and to arm a timer circuit.

\* \* \* \* \*